Dec. 25, 1956  O. W. PIES ET AL  2,775,736
VALVE LOCATING DEVICE
Filed Oct. 18, 1954  2 Sheets-Sheet 2
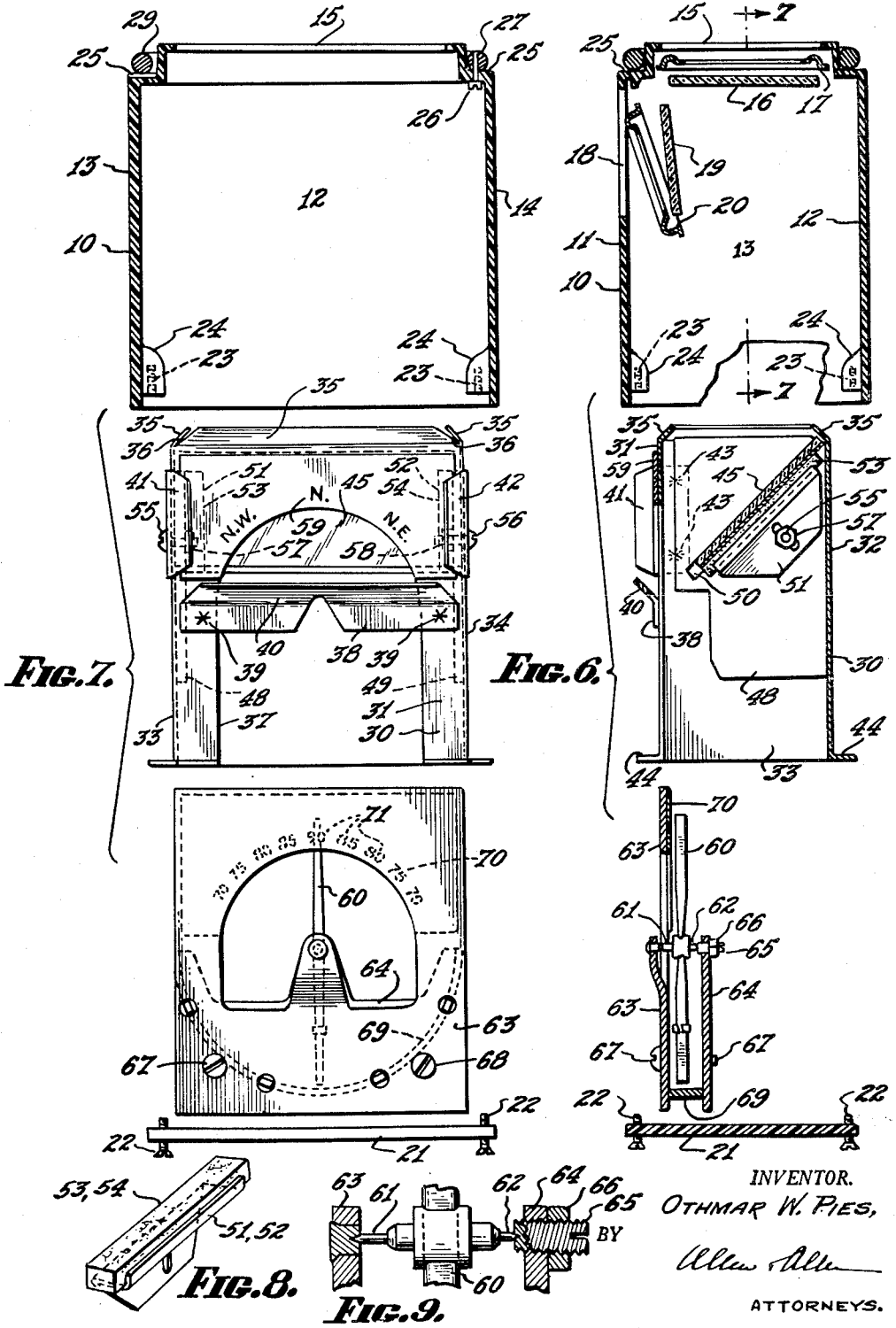
INVENTOR.
OTHMAR W. PIES,
BY
ATTORNEYS.

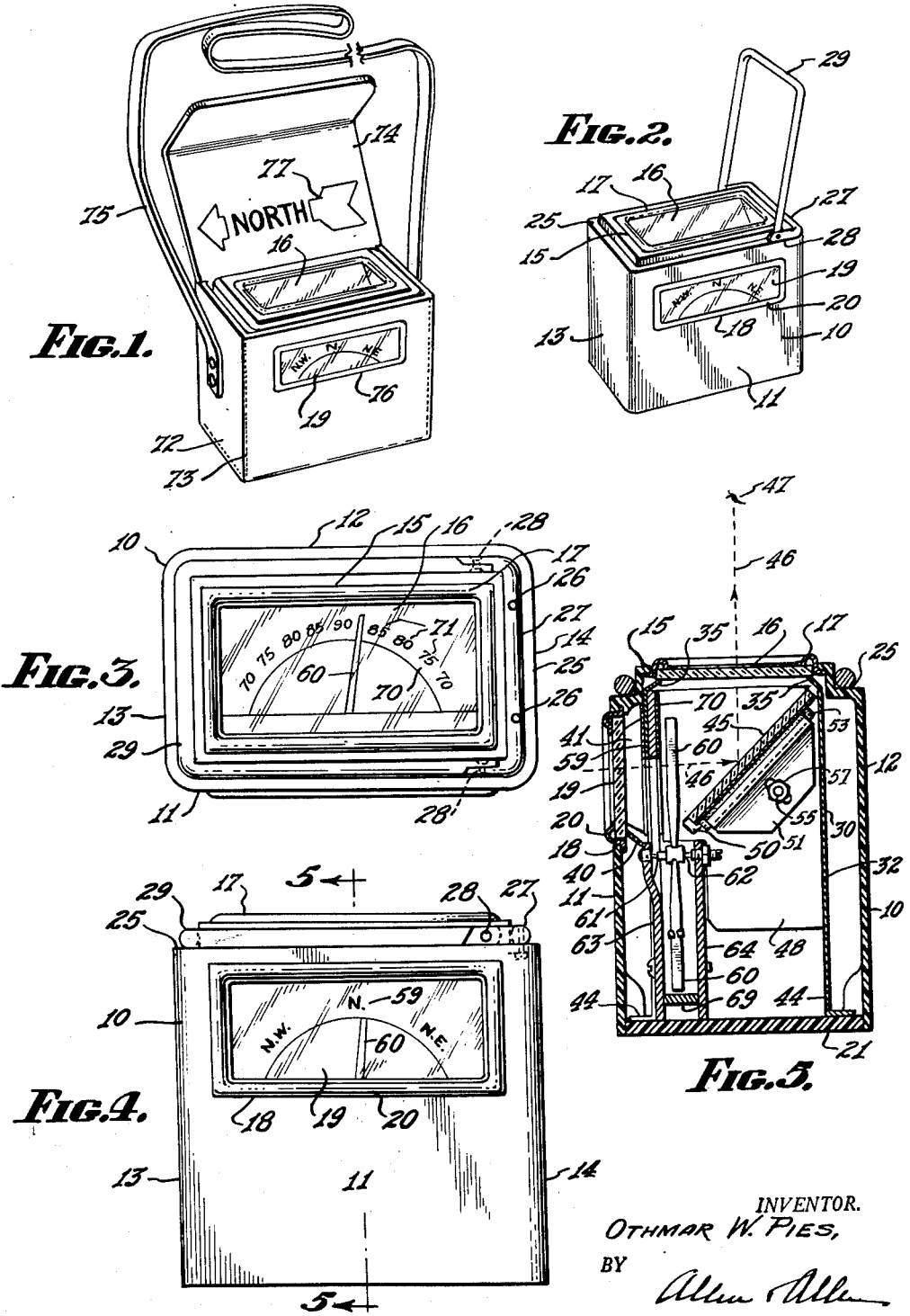

United States Patent Office 2,775,736
Patented Dec. 25, 1956

2,775,736
VALVE LOCATING DEVICE

Othmar W. Pies, Cincinnati, Ohio, William H. Middendorf, Covington, Ky., and Carl F. Evert, Jr., Cincinnati, Ohio; said Pies assignor to Aqua Survey & Instrument Company, Cincinnati, Ohio, a partnership Application October 18, 1954, Serial No. 463,015

2 Claims. (Cl. 324—48)

This invention relates to improvements in valve box locating devices such as those employed by meter readers, service men and others for locating buried valve boxes or similar objects, such devices being especially helpful in cases where a map or a chart to pin-point the precise location of the object is unavailable.

More particularly the invention relates to valve box locating devices of the type wherein a magnetic needle, well known in the art as a "dipping needle" is employed. Devices of this type usually also include a dial wherewith movement of the needle may be visually observed and compared, the needle and the dial being necessarily arranged in a vertical plane. The devices are usually also provided with a lengthened handle or strap by means of which the user may conveniently hold the device slightly above the ground level while standing or slowly walking in an erect position. In using a device of this type it is carefully moved back and forth above an area thought to seclude a sought buried object, the needle dipping to a position pointing straight down as the device is finally brought to position directly above that of the buried object, the object, of course, comprising a metal capable of causing deflection of the needle, all as well known in the art.

One objection to the devices of this type as heretofore provided is that during the manual act of moving one of the devices from place to place, it is often unintentionally tilted or rocked in such manner as to impart a rapid spinning movement to the needle. This spinning movement continues for some time and is annoying and time consuming to the user.

Another objection to the devices heretofore provided has been the inconvenience of observing the needle's position as one of the devices was moved from place to place along the ground. With the instrument at ground level and with its needle and dial arranged in a vertical plane, the indications thereof were somewhat obscured from the vantage of a user standing in erect position. Thus the task of checking the needle required repetitious stooping, bending or otherwise tiresome activities and postures on the part of the user.

From the foregoing therefore, it is one of the objects of the invention to provide an improved valve box locating device comprising a magnetic needle having a novel damping means associated therewith, whereby undue spinning of the needle is restrained.

Another object is to provide a valve box locating device comprising a mirror so arranged as to reflect an image of the needle upwardly, whereby reactions of the needle may be observed from directly above the device as the user stands or walks slowly in an erect position looking downward into the mirror and constantly observing reactions of the needle.

Still another object is to provide a valve box locating device having an improved casing for the parts whereby assembly or disassembly thereof is facilitated for purposes as required.

Other objects and advantages of the invention will be apparent during the course of the following description.

In the accompanying drawings forming a part of this specification, and in which like numerals are employed to designate like parts:

Figure 1 is a perspective view of a valve box locating device in accordance with the invention and having a carrying case comprising a lengthened handle or strap.

Figure 2 is a perspective view showing the device removed from the carrying case and with an auxiliary handle lifted into position for use.

Figure 3 is a top view of the device and illustrates an observer's view of the needle and dial as seen during employment of the device.

Figure 4 is a front elevational view showing the needle in an exemplary position with respect to a second dial comprising points of the compass.

Figure 5 is a vertical sectional view showing details of construction and arrangement of the parts within the casing, the view being taken along the line 5—5 of Figure 4.

Figure 6 is a sectional view similar to Figure 5 but with parts in disassembled relation.

Figure 7 is a view showing front elevational details of the parts shown in Figure 5, the upper portion of the figure being in section as indicated by the line 7—7 of Figure 6.

Figure 8 is a perspective view showing a mirror retaining bracket, and

Figure 9 is an enlarged sectional view taken along the line 9—9 of Figure 7 showing trunnioned mountings of the magnetic needle.

In the drawings wherein a preferred embodiment of the invention is illustrated the improved device has a rectangular outer casing 10 preferably formed of hard rubber or the like and comprising a front wall 11, a rear wall 12 and lateral walls 13 and 14.

The top of the casing has a rectangular opening 15 for purpose of mounting a window 16 having a pressed metal frame 17 while the front wall 11 has a rectangular opening 18 mounting a window 19 having a metal frame 20.

The casing also comprises a member 21 which serves as a bottom closure and also as a means for retaining other inner parts of the device, later to be described in detail, within the casing. As best illustrated in Figures 6 and 7 the member 21 is held by screws 22 engaging threaded holes 23 in lugs 24 formed at the inside corners of the casing side walls.

The side walls 11, 12, 13 and 14 at their upper ends have inturned shoulder portions forming a ledge generally indicated at 25. Mounted upon the ledge 25 by means of screws 26, 26, is a U-shaped rod 27 providing pivotal mountings 28, 28 for another U-shaped rod 29, the rod serving as an auxiliary handle when lifted to the position shown in Figure 2.

Referring now to Figures 5, 6 and 7, an inner casing or shell 30 is slidably fitted within the outer casing 10. The shell 30 comprises a front wall 31, a rear wall 32 and lateral walls 33 and 34. At their upper ends these walls are bent inwardly as generally indicated at 35, the corner junctures of the inturned parts being slit or cut as generally indicated at 36. The inner casing is formed of a light non-magnetic spring-like material and by the arrangement just described the inturned portions 35 serve as resilient means retaining the window 16 and its frame 17 in the assembled position of Figure 5.

The front wall 31 of the inner shell has an inverted U-shaped cut-out portion 37 and extending thereacross is a strip 38 of light springy metal affixed as by spot welds 39, 39, and bent forwardly as at 40. Other similarly bent spring metal pieces 41 and 42 are mounted as by spot welds 43 to the side walls 33 and 34 respectively. These resilient members 40, 41 and 42 serve as best seen in Figure 5 to retain the window 19 and its frame 20 in assembled position.

At their lower ends the various side walls of the shell 30 are turned outwardly forming foot portions or bearing pads generally indicated at 44. As best seen in Figure 5 the bottom closure panel 21 engages the bearing pads 44 to firmly hold the shell 30 and consequently the windows 16 and 19 in position.

Referring briefly to Figure 5 the shell 30 provides mountings for a mirror 45 which is diagonally disposed as shown to reflect light rays 46 entering through the window 19 upwardly through the window 16 to an observer's eye indicated at 47. For purpose of mounting the mirror 45 the walls 33 and 34 of the shell 30 are provided with plates 48 and 49 which plates as best seen in Figures 6 and 7 are slotted as at 50 to receive the mirror, the mirror being firmly held in position by means of clips 51 and 52 comprising cushioned strips 53 and 54 which bear against the mirror, the clips 51 and 52 being held in position within the shell by means of screws 55 and 56 having nuts 57 and 58, the screws also passing through and serving to retain the mirror mounting plates 48 and 49. The upper portion of the front wall 31 comprises a dial 59 having points of the compass inscribed thereon, the dial 59 being directly visible through the window 19.

As best seen in Figures 6, 7 and 9 a magnetic needle 60 has trunnions 61 and 62 providing pivoted mountings in frame members or plates 63 and 64, one of the mountings being adjustable as by means of a threaded screw 65 having a lock nut 66.

The rear side of the plate 63 comprises a dial 70 graduated in degrees as indicated at 71. An image of this dial and also of the needle 60 is visible through the window 16 by virtue of the mirror 45, an exemplary reading thereof being illustrated in Figure 3.

As well known in the art the plates 63 and 64 are preferably of a non magnetic material such as brass. Clamped between the plates by means of screws 67 and 68 is a semi-circular arcuate element 69 juxtaposed as shown to the magnetic needle 60. The arcuate element 69 is preferably of pure copper or pure aluminum or of an alloy containing a high percentage of either, the element serving as a damping means to retard undue movement of the needle. As well known in the art or in the study of electromotive forces, any undue movement such as spinning of the magnetic needle will induce eddy currents in the element 69, which eddy currents in turn create magnetic forces opposing and retarding movements of the needle.

As will be obvious to those skilled in the art best results of the damping action will be obtained with the needle 60 and the element 69 in close relation, but for practical purposes I have found that a clearance of $\frac{1}{32}$ inch between the needle and the damping element gives very satisfactory results.

It is to be mentioned that the details of the magnetic needle together with the processes of forming, magnetizing and balancing the needle form no part of this invention and are deemed for purposes of this specification to require no detailed description herein.

It will now be clear that the invention provides an improved device of the type described comprising a damping means whereby undue movements of the magnetic needle are restrained.

Referring to Figure 1 the improved device preferably includes a carrying case 72 of leather or the like having a main body portion 73 adapted to receive the casing 10. The case also has a hinged cover 74 and a lengthened handle or strap 75. An opening 76 in the front wall of the case reveals the window 19 together with the needle 60 and the dial 59 (as in Figure 5), whereby the device may be used as a compass to determine true direction of the north magnetic pole, this being an important factor in use of devices of this type.

Imprinted on the inner side of the lid 74 an arrow 72 indicates proper orientation of the device for best results. The hinged cover 74 when lifted to the position of Figure 1 reveals the window 16 together with an image of the needle and the dial 70 as reflected upwardly by virtue of the mirror 45. Thus, by use of the lengthened handle 75 and by virtue of the mirror 45 a user of the device may stand or walk slowly along in an erect position while moving the device from place to place looking downward into the mirror, and observing reactions of the needle. In cases where bushes are encountered the device may readily be removed from the case 72 and the auxiliary handle 29 employed as may be necessary.

From the foregoing description it will now also be clear that the invention provides improved means comprising a mirror whereby the task of checking the needle's movements may be accomplished while the user stands in erect and comfortable position.

As before stated, Figures 6 and 7 show the principal parts in disassembled relation and it will be obvious therefrom that all elements of the device are conveniently accessible for repairs. In assembling the parts the outer casing 10 is inverted and the window 16 with its frame 17 is placed in position where it remains by cause of gravity. The window 19 and its frame 20 are next placed into position and held from falling therefrom by manual use of a thin blade pressing against the members while the inner shell 30 is slipped into place, whereupon the blade is withdrawn and the inner shell retains the window parts in position. Next the needle assembly comprising the plates 63 and 64 is slipped into position, the needle and the dial 70 being positioned between the mirror 45 and the window 19. Last the bottom closure is affixed by means of the screws 22 to retain the entire assembly of parts in position.

It will now be clear that the invention also provides an improved casing for the parts whereby assembly and disassembly of the device is facilitated.

It is to be understood that the form of the invention herein shown and described is to be taken as a preferred embodiment of the same, and that various changes in the shape, size, and arrangement of the parts may be readily devised without departing from the scope of the appended claims.

Having thus described my invention what I claim as new and desire to secure by Letters Patent is:

1. In a valve box locating device, an outer casing having an aperture, a window member comprising a frame arranged within said aperture, a magnetic needle having trunnioned mountings between a pair of spaced plates and comprising damping means positioned between said spaced plates and arranged around the arc of movement of said needle, an inner shell slidably fitting within said outer casing and having resilient means retaining said window in position, and a bottom closure member retaining said inner shell and said magnetic needle in position within said outer casing.

2. In a valve box locating device, an outer casing having apertures, window members comprising frames arranged within said apertures, a sub-assembly of parts comprising a magnetic needle having pivotal mountings between a pair of spaced plates and including damping means arranged around the arc of movement of the tip of said needle, an inner shell slidably fitting within said outer casing and comprising resilient means retaining said window members in position and also mounting a mirror in a plane diagonally disposed to the plane of said magnetic needle, and a bottom closure member retaining said inner shell and said sub-assembly of parts comprising a magentic needle in assembled relation within said outer casing.

References Cited in the file of this patent

UNITED STATES PATENTS

| 887,140 | Stedman | May 12, 1908 |
| 961,298 | Jewell | June 14, 1910 |
| 2,181,815 | Kuntze et al. | Nov. 28, 1939 |
| 2,315,176 | Zacharia | Mar. 30, 1943 |
| 2,402,638 | Krasnow et al. | June 25, 1946 |
| 2,430,616 | Pearson | Nov. 11, 1947 |
| 2,641,159 | Mihalakis | June 9, 1953 |

FOREIGN PATENTS

| 725,710 | Germany | Aug. 13, 1942 |